US011474356B2

(12) United States Patent
Luo et al.

(10) Patent No.: US 11,474,356 B2
(45) Date of Patent: Oct. 18, 2022

(54) OPTICAL ASSEMBLY AND VIRTUAL REALITY DEVICE

(71) Applicants: ORDOS YUANSHENG OPTOELECTRONICS CO., LTD., Ordos (CN); BOE TECHNOLOGY GROUP CO., LTD., Beijing (CN)

(72) Inventors: Peng Luo, Beijing (CN); Zhiqiang Wang, Beijing (CN); Xinchao Cui, Beijing (CN); Delong Zhong, Beijing (CN); Jianfei Tian, Beijing (CN); Yadong Qiu, Beijing (CN)

(73) Assignees: ORDOS YUANSHENG OPTOELECTRONICS CO., LTD., Inner Mongolia (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 99 days.

(21) Appl. No.: 16/334,573

(22) PCT Filed: Oct. 25, 2018

(86) PCT No.: PCT/CN2018/111793
§ 371 (c)(1),
(2) Date: Mar. 19, 2019

(87) PCT Pub. No.: WO2019/184322
PCT Pub. Date: Oct. 3, 2019

(65) Prior Publication Data
US 2022/0050291 A1 Feb. 17, 2022

(30) Foreign Application Priority Data
Mar. 30, 2018 (CN) .......................... 201810288795.9

(51) Int. Cl.
*G09G 5/00* (2006.01)
*G02B 27/01* (2006.01)

(52) U.S. Cl.
CPC .. *G02B 27/0172* (2013.01); *G02B 2027/0134* (2013.01)

(58) Field of Classification Search
CPC .................... G02B 27/0172; G02B 2027/0134
(Continued)

(56) References Cited

U.S. PATENT DOCUMENTS 3,616,732 A * 11/1971 Rucinski ............... H01J 9/2271
430/5
9,459,457 B2 * 10/2016 Murray ................ H04N 13/344
(Continued)

FOREIGN PATENT DOCUMENTS

| CN | 104777616 A | 7/2015 |
| CN | 204536735 U | 8/2015 |

(Continued)

OTHER PUBLICATIONS

First Chinese Office Action for Chinese Patent Application No. 201810288795.9, dated Mar. 25, 2019, 13 pages.
(Continued)

*Primary Examiner* — Jonathan M Blancha
(74) *Attorney, Agent, or Firm* — Kinney & Lange, P.A.

(57) ABSTRACT

An optical assembly and a virtual reality device are provided. The optical assembly includes a light-transmitting device, a light-converging device, and a light-reflecting device. The light-transmitting device is configured to receive light of a left-eye display image and light of a right-eye display image, and transmit the light of the left-eye display image and the light of the right-eye display image to a light-converging device. The light-converging device is configured to converge the light of the left-eye display image
(Continued)

and the light of the right-eye display image to a light-reflecting device. A size of a first display image formed by converging the light of the left-eye display image is smaller than a size of the left-eye display image, and a size of a second display image formed by converging the light of the right-eye display image is smaller than a size of the right-eye display image. The light-reflecting device is configured to reflect light of the first display image to a left eye of a user, and reflect light of the second display image to a right eye of the use.

5 Claims, 2 Drawing Sheets

(58) Field of Classification Search
USPC .............................................................. 345/8
See application file for complete search history.

(56) References Cited

U.S. PATENT DOCUMENTS

| | | | |
|---|---|---|---|
| 2013/0222384 A1* | 8/2013 | Futterer | H04N 13/344 345/426 |
| 2016/0313558 A1 | 10/2016 | Gutierrez | |
| 2017/0176750 A1* | 6/2017 | Huang | G02B 27/0025 |

FOREIGN PATENT DOCUMENTS

| | | |
|---|---|---|
| CN | 106199972 A | 12/2016 |
| WO | 2016176207 A1 | 11/2016 |

OTHER PUBLICATIONS

International Search Report and Written Opinion for International Patent Application No. PCT/CN2018/111793, dated Mar. 30, 2018, 11 pages.

* cited by examiner

OPTICAL ASSEMBLY AND VIRTUAL REALITY DEVICE

CROSS-REFERENCE TO RELATED APPLICATION

The present application is the U.S. national phase counterpart of PCT Application No. PCT/CN2018/111793 filed on Oct. 25, 2018, which claims priority of Chinese patent application No. 201810288795.9 filed on Mar. 30, 2018, both of which are incorporated herein by reference in their entireties.

TECHNICAL FIELD

The present disclosure relates to the field of Virtual Reality (VR) technology, for example to an optical assembly and a VR device.

BACKGROUND

With development of the VR technology, VR device have been widely used in various fields. The VR products include wearable devices (e.g., VR glasses and VR helmet). Wearable VR devices have small-sized display screens.

SUMMARY

The present disclosure provides an optical assembly including: a light-transmitting device, configured to receive light of a left-eye display image and light of a right-eye display image, and transmit the light of the left-eye display image and the light of the right-eye display image to a light-converging device; the light-converging device, configured to converge the light of the left-eye display image and the light of the right-eye display image to a light-reflecting device, wherein a size of a first display image formed by converging the light of the left-eye display image is smaller than a size of the left-eye display image, and a size of a second display image formed by converging the light of the right-eye display image is smaller than a size of the right-eye display image; and the light-reflecting device, configured to reflect light of the first display image to a left eye of a user, and reflect light of the second display image to a right eye of the user.

In some embodiments, the light-transmitting device is an optical prism.

In some embodiments, the light-converging device includes: a left-eye lens, configured to converge the light of the left-eye display image to the light-reflecting device; and a right-eye lens, configured to converge the light of the right-eye display image to the light-reflecting device.

In some embodiments, the left-eye lens and the right-eye lens are both convex lenses.

In some embodiments, the light-reflecting device includes an illuminant shield, wherein the illuminant shield is arranged on an optical path of emergent light of the light-converging device, and the illuminant shield is configured to display the first display image and the second display image, and reflect the light of the first display image and the light of the second display image.

In some embodiments, the light-reflecting device further includes a plane mirror; wherein the plane mirror is arranged on an optical path of light reflected by the illuminant shield, and the plane mirror is configured to reflect the light of the first display image reflected by the illuminant shield to the left eye of the user, and reflect the light of the second display image reflected by the illuminant shield to the right eye of the user.

In some embodiments, a geometric center of the optical prism, a geometric center of the left-eye lens, a geometric center of the right-eye lens, and a geometric center of the illuminant shield are arranged on a same plane.

In some embodiments, the same plane where the geometric center of the optical prism, the geometric center of the left-eye lens, the geometric center of the right-eye lens, and the geometric center of the illuminant shield are arranged in parallel to an XOY plane of a three-dimensional coordinate system. An angle between a normal of the illuminant shield in a reflection direction of the illuminant shield and a Z-axis of the three-dimensional coordinate system, and an angle between a normal of the plane mirror in a reflection direction of the plane mirror and the Z-axis, are supplementary angles. A distance of an optical path from the left-eye display image to the left-eye lens is greater than a focal length of the left-eye lens, and a distance of an optical path from the right-eye display image to the right-eye lens is greater than a focal length of the right-eye lens.

The present disclosure provides a VR device including any one of the optical assembly described above.

In some embodiments, the VR device further includes: a left-eye display screen configured to display the left-eye display image; and a right-eye display screen configured to display the right-eye display image.

DETAILED DESCRIPTION OF THE EMBODIMENTS

It is difficult to display a high-resolution VR image on a small-sized display screen. In following embodiments, an optical assembly and a VR device are provided for displaying a small-sized and high-resolution VR image.

Figure 1:
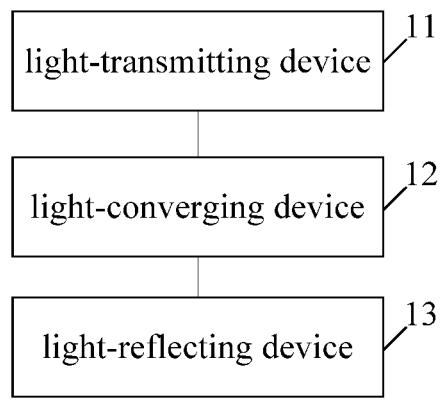
FIG. 1 is a logical schematic view showing an optical assembly according to some embodiments.

In some embodiments, an optical assembly is provided. As shown in FIG. 1, the optical assembly includes a light-transmitting device 11, a light-converging device 12 and a light-reflecting device 13.

The light-transmitting device 11 is configured to receive light of a left-eye display image and light of a right-eye display image, and transmit the light of the left-eye display image and the light of the right-eye display image to a light-converging device 12.

The light-converging device 12 is configured to converge the light of the left-eye display image and the light of the right-eye display image to a light-reflecting device, wherein a size of a first display image formed by converging the light of the left-eye display image is smaller than a size of the left-eye display image, and a size of a second display image formed by converging the light of the right-eye display image is smaller than a size of the right-eye display image.

The light-reflecting device 13 is configured to reflect light of the first display image to a left eye of a user, and reflect light of the second display image to a right eye of the user.

In some embodiments, the right-eye display image and the right-eye display image are high-resolution images adapted to be displayed on a large-sized display screen. The optical assembly converges the light of the left-eye display image and the light of the right-eye display image, so as to enable images formed by such convergence to be adapted for displaying with a device having a small-sized display screen. Since the convergence does not affect the resolution, a VR image that the optical assembly ultimately presents to users has a very high definition. In the above embodiments, a VR image with a high resolution can be displayed on the small-sized display screen based on a simple optical structure, which improves user experience of the VR device.

In some embodiments, a size of the large-sized screen is greater than 5 inches.

In some embodiments, the "high resolution" refers to a screen resolution of Quarter High Definition (QHD), that is, the screen resolution is 960×540.

In some embodiments, the "high resolution" refers to a screen resolution of Ultra High Definition (UHD), that is, the resolution is 3840×2160.

In some embodiments, the "high resolution" refers to a pixel density greater than 600 ppi.

In some embodiments, the light-transmitting device, the light-converging device and the light-reflecting device of the optical assembly are implemented by different optical components.

Figure 2:
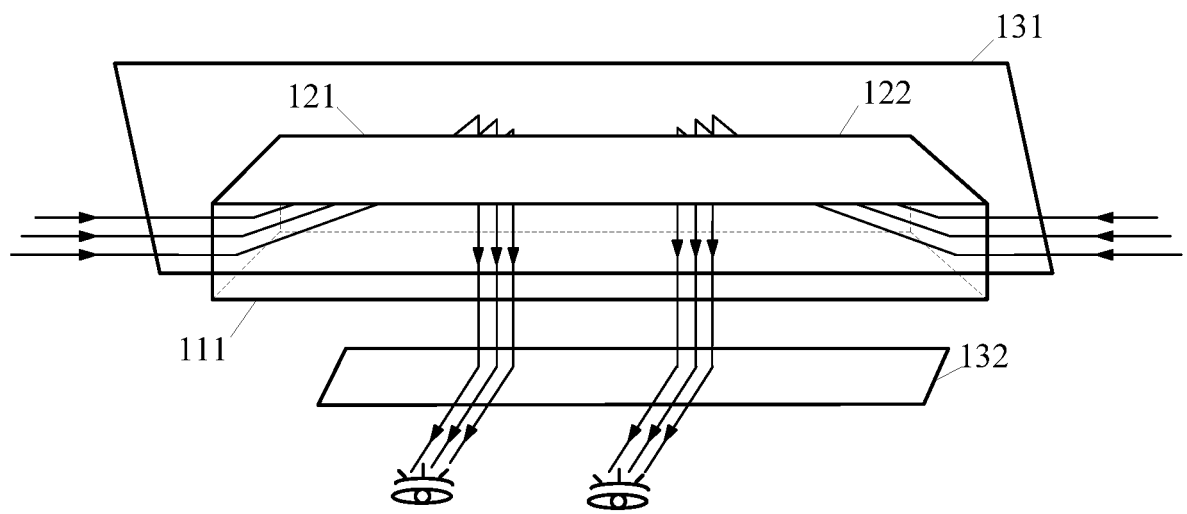
FIG. 2 is a physical schematic view showing an optical assembly according to some embodiments.
Figure 3:
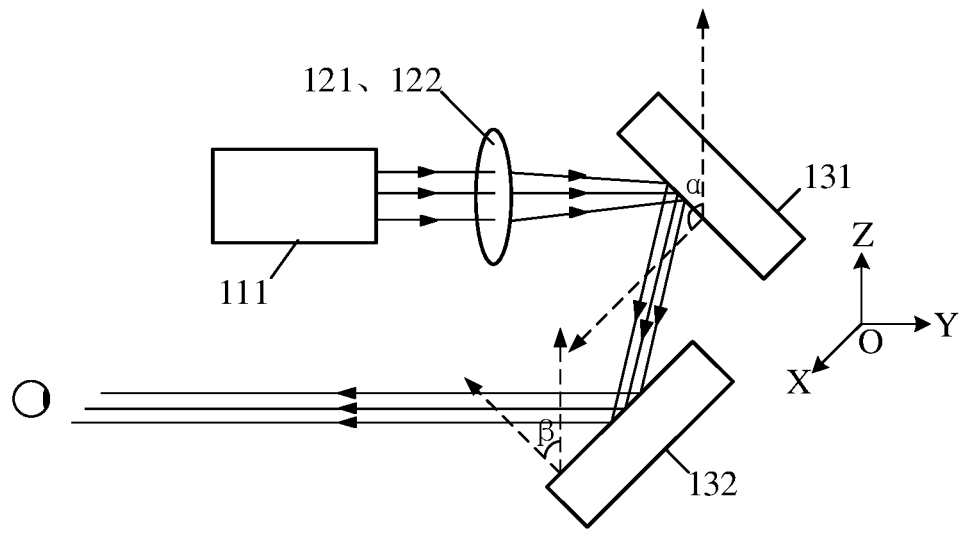
FIG. 3 is a physical schematic view showing an optical assembly according to some other embodiments.

In some embodiments, as shown in FIGS. 2 and 3, the optical assembly includes an optical prism 111, a left-eye lens 121, a right-eye lens 122, an illuminant shield 131 and a plane mirror 132.

The light-transmitting device 11 includes the optical prism 111.

The light-converging device 12 includes the left-eye lens 121 and the right-eye lens 122.

In some embodiments, the left-eye lens 121 and the right-eye lens 122 are both convex lenses with a light convergence function.

The light-reflecting device 13 includes the illuminant shield 131 and the plane mirror 132.

In some embodiments, in order to reduce a space occupied by the light assembly, a geometric center of the optical prism 111, a geometric center of the left-eye lens 121, a geometric center of the right-eye lens 122, and a geometric center of the light screen 131 are located on a same plane.

For example, as shown in FIG. 3, in the condition that the geometric center of the optical prism 111, the geometric center of the left-eye lens 121, the geometric center of the right-eye lens 122, and the geometric center of the light screen 131 are located on an XOY plane of a three-dimensional coordinate system, an angle α between a normal of the illuminant shield 131 in a reflection direction of the illuminant shield 131 and a Z-axis of the three-dimensional coordinate system, and an angle β between a normal of the plane mirror 132 in a reflection direction of the plane mirror 132 and the Z-axis, are supplementary angles. In other words, the normal of the illuminate shield 131 extends in the reflection direction of the illuminate shield 131, the normal of the plane mirror 132 extends in the reflection direction of the plane mirror 132, and the angle α between the normal of the illuminant shield 131 and the Z-axis and the angle β between the normal of the plane mirror 132 and the Z-axis are supplementary angles.

That is, a reflecting surface of the illuminant shield 131 and a reflecting surface of the plane mirror 132 are perpendicular to each other. For example, the angle α is 135°, and the angle β is 45°; or the angle α is 45°, and the angle β is 135°. Based on such structural design, the light of the left-eye display image is transmitted to the left eye of the user, and the light of the right-eye display image is transmitted to the right eye of the user.

When the light of the left-eye display image is incident on the optical prism 111, it is reflected by the optical prism 111 to the left-eye lens 121; and when the light of the right-eye display image is incident on the optical prism 111, it is reflected by the optical prism 111 to the right-eye lens 122.

The left-eye lens 121 converges the light of the left-eye display image to the illuminant shield 131, to obtain the first display image. The right-eye lens 122 converges the light of the right-eye display image to the illuminant shield 131, to obtain the second display image. When a distance of an optical path from the left-eye display image to the left-eye lens 121 is greater than a focal length of the left-eye lens 121, the first display image is an inverted and reduced real image displayed on the illuminant shield 131. When a distance of an optical path from the right-eye display image to the left-eye lens 122 is greater than a focal length of the right-eye lens 122, the second display image is an inverted and reduced real image displayed on the illuminant shield 131.

The illuminant shield 131 is a screen with certain brightness, and a brightness of the real image displayed on the illuminant shield 131 may change with a brightness of the illuminant shield 131 to adjust a brightness of the VR image.

The light of the first display image and the light of the second display image are reflected by the illuminant shield 131 to the plane mirror 132. The plane mirror 132 is located on an optical path of the light reflected by the illuminant shield 131, and reflects the light of the first display image reflected by the illuminant shield 131 in a positive direction of the X-axis to the left eye of the user, and reflects the light of the second display image reflected by the illuminant shield 131 in the positive direction of the X-axis to the right eye of the user, so as to present the VR image.

In the above embodiments, a large-sized display image is converged to a small-sized real image through the light convergence function of the convex lens, and a space occupied by the VR components is reduced by reflecting the optical path through the optical prism, the illuminant shield, the plane mirror and the like. When an image light source before such converging process has a high resolution, an image after the converging process can achieve a higher resolution.

In some embodiments, the light-transmitting device, the light-converging device and the light-reflecting device may be implemented by other optical components.

For example, the light-transmitting device adopts a lens, instead of the optical prism, to implement a function of transmitting light; the light-reflecting device consists of a plane mirror, and the converged light of the left-eye display image is directly reflected by the plane mirror to the left eye of the user, and the converged light of the right-eye display image is directly reflected by the plane mirror to the right eye of the user.

For another example, the light-reflecting device consists of the illuminant shield, and the converged light of the left-eye display image is directly reflected by the illuminant shield to the left eye of the user, and the converged light of the right-eye display image is directly reflected by the illuminant shield to the right eye of the user.

In some embodiments, a VR device is provided that includes the optical assembly provided by any one of the above embodiments.

Based on the optical assembly, the space occupied by the VR device is reduced and a VR image with an ultra-high resolution is achieved, which is suitable for being used in a wearable device.

In some embodiments, the wearable device is a pair of VR glasses.

In some embodiments, the wearable device is a VR helmet.

The VR glasses and the VR helmet have a small-sized display screen, making it difficult to display a VR image with a high-resolution. With the VR device of the above embodiments, an image definition of the wearable VR device is improved.

Figure 4:
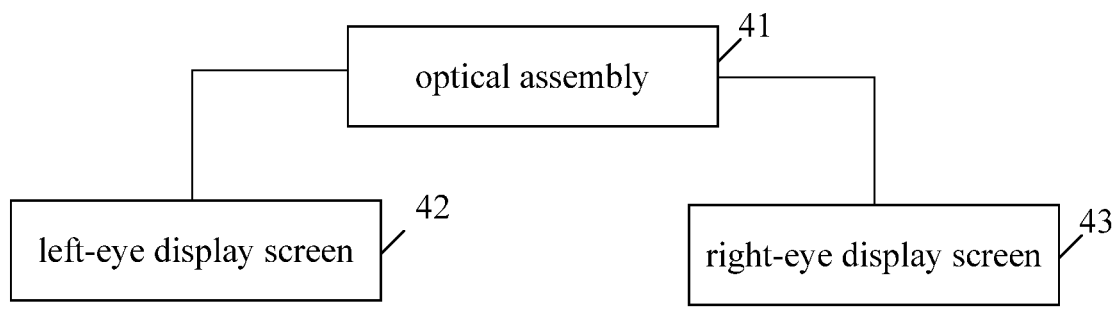
FIG. 4 is a logical schematic view showing a VR helmet according to some embodiments.

For example, the VR device is the VR helmet, as shown in FIG. 4, the VR helmet includes an optical assembly 41, a left-eye display screen 42 and a right-eye display screen 43.

The left-eye display screen 42 is configured to display the left-eye display image.

The right-eye display screen 43 is configured to display the right-eye display image.

In some embodiments, the left-eye display screen 42 and the right-eye display screen 43 are large-sized screens with high resolutions, the left-eye display screen 42 transmits the light of the left-eye display image to the light-transmitting device of the optical assembly 41, the right-eye display screen 43 transmits the light of the right-eye display image to the light-transmitting device of the optical assembly 41, and the optical assembly 41 receives and converges the light of the left-eye display image and the light of the right-eye display image, to obtain a small-sized and high-resolution VR image.

In some embodiments, the "small-sized" refers to that a screen size is less than 3 inches.

In some embodiments, the "small-sized" refers to that the screen size is greater than or equal to 2 inches and less than or equal to 3 inches.

Figure 5:
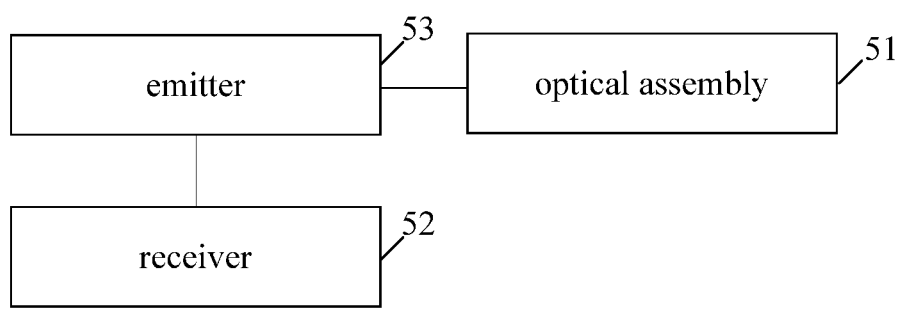
FIG. 5 is a logical schematic view showing VR glasses according to some embodiments.

In some embodiments, the VR device is a pair of VR glasses, as shown in FIG. 5, the VR glasses includes an optical assembly 51, a receiver 52, and an emitter 53.

The receiver 52 is configured to receive information of the left-eye display image and information of the right-eye display image.

The emitter 53 is configured to emit the left-eye display image and the right-eye display image to the optical assembly 51 in accordance with the information of the left-eye display image and the information of the right-eye display image.

In some embodiments, the information of the left-eye display image and the information of a right-eye display image are information of images configured to be displayed by a large-sized and high-resolution display device.

In some embodiments, the receiver 52 is a communication device.

For example, the receiver 52 is Bluetooth communication device or Wireless-Fidelity (WiFi) communication device. The receiver 52 wirelessly receives the information of the image (for example, the receiver 52 interacts with the large-sized and high-resolution display device to receive the display image of the large-sized and high-resolution display device), the light of the image information is ultimately emitted by the emitter 53 to the optical assembly 51, and the optical assembly 51 receives and converges the light emitted by the emitter 53 to obtain the small-sized and high-resolution VR image.

Unless otherwise defined, any technical or scientific term used in the present disclosure shall have the common meaning understood by a person of ordinary skill in the art. Such words as "include" used in the specification and "comprise/comprising" in claims mean that components and objects and the like after such words are parts of components and objects before such words, and the components and objects before such words dose not exclude other components and objects.

What is claimed is:

1. An optical assembly, comprising:
    a light-transmitting device configured to receive light of a left-eye display image and light of a right-eye display image, and to transmit the light of the left-eye display image and the light of the right-eye display image to a light-converging device,
    wherein the light-converging device is configured to converge the light of the left-eye display image and the light of the right-eye display image to a light-reflecting device, wherein a size of a first display image formed by converging the light of the left-eye display image is smaller than a size of the left-eye display image, and a size of a second display image formed by converging the light of the right-eye display image is smaller than a size of the right-eye display image;
    wherein the light-reflecting device is configured to reflect light of the first display image to a left eye of a user, and to reflect light of the second display image to a right eye of the user;
    wherein the light-transmitting device is an optical prism;
    wherein the light-converging device comprises:
        a left-eye lens, configured to converge the light of the left-eye display image to the light-reflecting device; and
        a right-eye lens, configured to converge the light of the right-eye display image to the light-reflecting device;
    wherein the light-reflecting device comprises an illuminant shield;
    wherein the illuminant shield is arranged on an optical path of emergent light of the light-converging device, and the illuminant shield is configured to display the first display image and the second display image, and reflect the light of the first display image and the light of the second display image;
    wherein the light-reflecting device further comprises a plane mirror;
    wherein the plane mirror is arranged on an optical path of the light reflected by the illuminant shield, and the plane mirror is configured to reflect the light of the first display image reflected by the illuminant shield to the left eye of the user, and reflect the light of the second display image reflected by the illuminant shield to the right eye of the user; and
    wherein a geometric center of the optical prism, a geometric center of the left-eye lens, a geometric center of the right-eye lens, and a geometric center of the illuminant shield are arranged on a same plane.

2. The optical assembly according to claim 1, wherein the left-eye lens and the right-eye lens are both convex lenses.

3. The optical assembly according to claim 1, wherein
    the same plane where the geometric center of the optical prism, the geometric center of the left-eye lens, the geometric center of the right-eye lens, and the geometric center of the illuminant shield are arranged in parallel to an XOY plane of a three-dimensional coordinate system;

an angle between a normal of the illuminant shield in a reflection direction of the illuminant shield and a Z-axis of the three-dimensional coordinate system, and an angle between a normal of the plane mirror in a reflection direction of the plane mirror and the Z-axis, are supplementary angles; and a distance of an optical path from the left-eye display image to the left-eye lens is greater than a focal length of the left-eye lens, and a distance of an optical path from the right-eye display image to the right-eye lens is greater than a focal length of the right-eye lens.

4. A virtual reality (VR) device, comprising the optical assembly according to claim 1.

5. The VR device according to claim 4, further comprising:

a left-eye display screen, configured to display the left-eye display image; and a right-eye display screen, configured to display the right-eye display image.

\* \* \* \* \*